May 18, 1948. W. F. MITCHELL 2,441,716
MICROMETER SETTING DEVICE FOR BORING MACHINES
Original Filed March 18, 1943
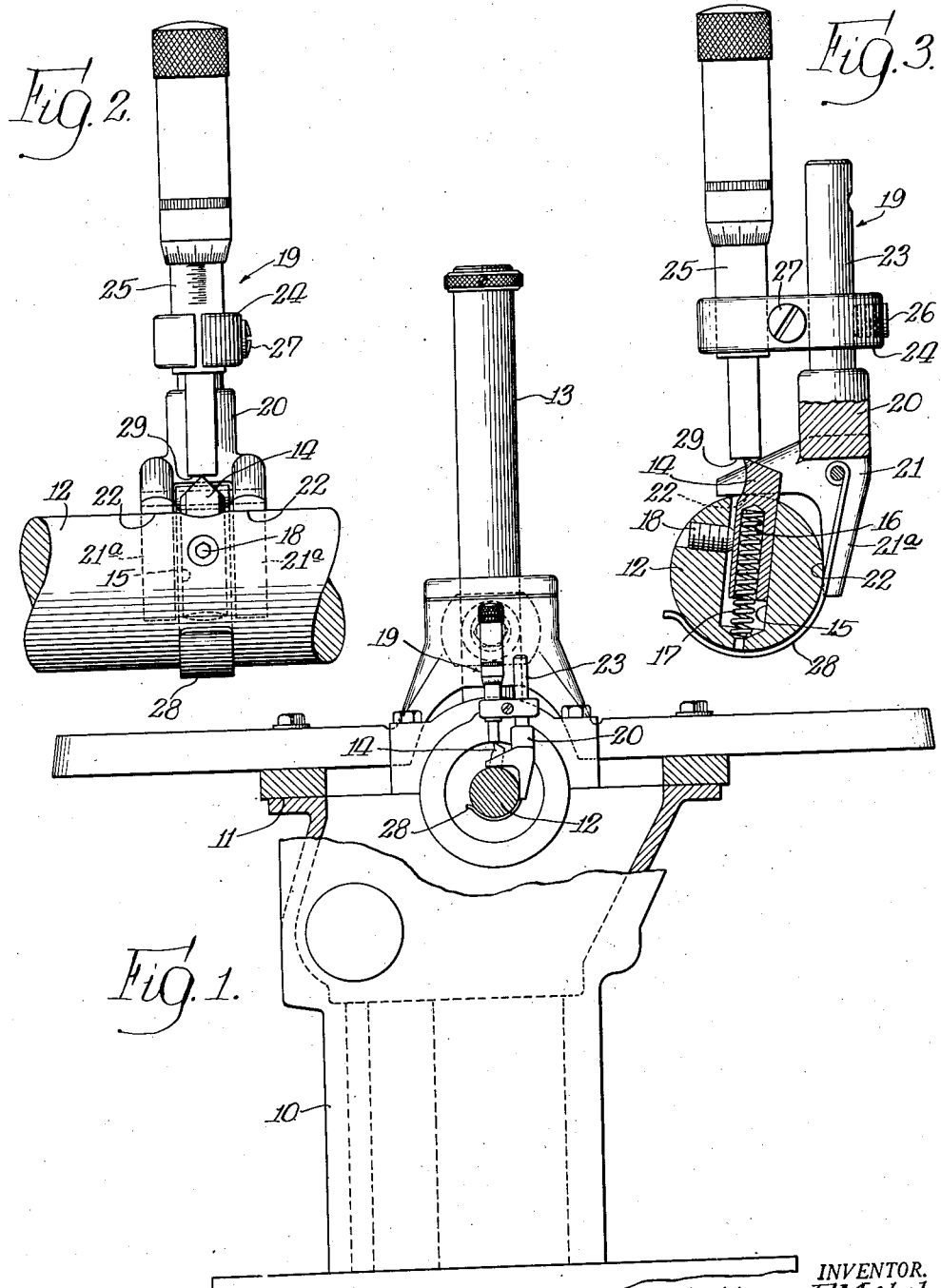
INVENTOR.
Wallace F. Mitchell.
BY
Davis, Lindsey, Smith & Shonts
Attys.

Patented May 18, 1948

2,441,716

UNITED STATES PATENT OFFICE 2,441,716

MICROMETER SETTING DEVICE FOR BORING MACHINES

Wallace F. Mitchell, Chicago, Ill., assignor to Ammco Tools, Inc., a corporation of Illinois Original application March 18, 1943, Serial No. 479,579. Divided and this application February 17, 1944, Serial No. 522,764

7 Claims. (Cl. 33—185)

My invention relates generally to boring machines adapted for the boring of one or a plurality of so-called in-line bearings and it has to do particularly with a micrometer device for setting the tool bit of the boring machine. This application is a division of my copending application Serial No. 479,579, filed May 18, 1943, for Boring machine which has matured into Patent No. 2,401,838, granted June 11, 1946.

One of the objects of my invention is to provide an improved micrometer device for setting the tool bit of a boring machine or the like, whereby the boring operation may be carried out accurately and with a higher degree of efficiency than possible with machines of like kind heretofore devised.

Another object is to provide a tool bit with a means for boring machines and the like which functions in a purely mechanical manner and eliminates the sense of feel, thereby insuring accurate setting of the tool bit.

An additional object is to provide a tool bit with a means of the foregoing character which is adapted to be self-retained upon the boring bar in such a way as to effect a positive micrometer setting of the tool bit.

Other objects and advantages will become apparent as this description progresses and by reference to the drawing wherein—

Figure 1 is a partial transverse sectional view of a boring machine and illustrating the manner of use of my micrometer setting device in setting a tool bit carried by a boring bar;

Fig. 2 is an enlarged front elevational view of the micrometer device shown in Fig. 1, the same being illustrated as applied to the boring bar and the tool bit thereof; and Fig. 3 is a side elevational view partially in section of the structure shown in Fig. 2.

The boring machine structure shown in Fig. 1 of the drawing is particularly adapted for the boring of crank shaft and cam shaft bearings, and such structure is fully described in my said copending application Serial No. 479,579. It is to be understood that although my invention is particularly suited for the work just stated, it may be used and has utility in connection with the boring of bearings of any kind where similar conditions of use are to be met and wherever the mechanism is capable of installation for utilization of the advantages to be attained through it.

In the use of the foregoing structure for boring crank shaft bearings, as illustrated in Fig. 1, a cylinder block 10 containing such bearings is inverted so as to bring its crank shaft pan rail surfaces 11 to an upright position for receiving and supporting the boring machine. The crankshaft bearings to be bored are located within the cylinder block at spaced points as will be well understood. The machine illustrated includes a boring bar 12 carried by universally-supported members 13 in centered relation with respect to the bearings. This mechanism is fully described in my said copending application and this is also true of drive and feed mechanism for rotating the boring bar 12 and for advancing it along the bearing being bored.

The boring operation is effected by a tool bit 14 carried by the boring bar 12. More particularly, the tool bit 14 is adapted to be mounted in a radial slideway 15 (Fig. 3) in the boring bar, the bit being of slightly less dimension than such slideway to permit free movement of the same therein. The bit 14 is provided with a longitudinal opening 16 which receives and supports the end of a spring 17, the other end of which spring engages the bottom of the slideway 15 so as to constantly tend to urge the bit 14 outwardly. The bit 14 is adapted to be secured in position by a set screw 18, the adjustment of the bit 14 being determined by a novel micrometer device 19 embodying my invention and which will now be described.

This micrometer device includes a micrometer frame 20 having a bifurcate bar-engaging portion 21. The legs 21ª provided by the bifurcate bar-engaging portion 21 have V-shaped bar-engaging flat surfaces or faces providing peripherally spaced lines 22 of bar contact extending longitudinally of the bar providing a stable and firm engagement between the frame 20 and the boring bar 12. Each leg 21ª is also bifurcated to contact the bar at points spaced longitudinally of the bar, thus determining the line 22. The upper part of the micrometer frame 20 takes the form of an upstanding finished cylindrical shank 23 which receives and supports one end of a micrometer barrel supporting clamp 24, the other end of which receives and supports the micrometer barrel 25. The clamp 24 is provided in one end thereof with a lock screw 26 which is adapted to engage a pair of spaced-apart depressions in the upright or shank 23 so as to lock the clamp 24, together with the micrometer barrel carried thereby, at the desired operating height along the shank 23. This is provided for the purpose of increasing the range of the micrometer. The clamp 24 is further provided with a clamp screw 27 which, when tightened, securely locks the micrometer barrel 25 in position therein with the spindle of the micrometer parallel to the shank 23 and perpendicular to the flat surface on the upper arm 21a.

In the use of this micrometer to set the tool bit 14, with a boring bar of a diameter such that the radius of the bar at the point of contact with the upper arm 21a coincides with the axis of the spindle of the micrometer, the micrometer is first adjusted to the boring diameter of the bearing to be bored. It is then placed upon the boring bar in the manner illustrated in Fig. 3, being retained firmly in place thereon by a spring clip 28 which is hingedly connected at one end between the legs 21a of the micrometer support with its other end shaped to snap-engage the boring bar past center in such a way as to self-retain the micrometer in position upon the boring bar with the flat surfaces of the arms tangentially engaging the bar. The micrometer frame is then rotated to a position, such as illustrated in Fig. 3, wherein the cutting point of the boring bit 14 engages the micrometer spindle anvil 29 on the center thereof. The micrometer frame and the supporting legs thereof which engage the boring bar are so located relative to the axis of the micrometer spindle that when the center of the spindle anvil is engaged with the boring bit a line passing through the axis of the micrometer spindle, the center of the spindle anvil and the point of the boring bit passes through the line of contact 22 between the upper micrometer supporting leg 21a and the axis of the boring bar 12. By providing this arrangement I avoid amplification of error in the micrometer adjustment which may exist due to wear and the like in the tool parts. In the use of the micrometer the properly adjusted micrometer spindle is moved over the tool bit which at that time is preferably held in a depressed condition. With the micrometer anvil properly in place the set screw 18 is loosened sufficiently to permit the spring 17 to move the tool bit up into engagement with the anvil, at which time the set screw is again tightened to securely lock the tool bit in its adjusted condition. If desired, to avoid any possible injury to the tool bit, the micrometer before being properly set, but after being positioned on the boring bar, may be turned down to engage the depressed boring bit, the boring bit then released and the micrometer then set to the proper diameter, after which the tool bit is tightened in place. In either event, after the adjusted tool bit is fastened in place, the micrometer is detached by releasing the spring clamp 28 sufficiently to permit the removal from the boring bar.

While it is preferred to use the micrometer device with a boring bar of such diameter that the cutting point of the bit when set engages the spindle anvil 29 on the center thereof, it is obvious that the device may be used to accurately set the projection of the bit beyond a bar of different diameter. Thus, if the boring bar is somewhat smaller in diameter than that above mentioned, the bar will engage the upper or horizontal arm 21a, as viewed in Fig. 3, at a point slightly to the right of that shown, and the cutting point of the bit when in its uppermost position will engage the anvil 29 to the right of the center thereof. The micrometer, however, will give a correct reading for the distance the bit projects beyond the bar, so that, knowing the bar diameter, the bit can be accurately set to bore a given diameter. Similarly, if the bar is somewhat larger in diameter than that above mentioned, the bar will engage the upper or horizontal arm 21a, as viewed in Fig. 3, at a point slightly to the left of that shown, and the cutting point of the bit will engage the anvil 29 to the left of the center thereof. Obviously, the bit setting will also be correct in this instance. Thus, the micrometer device may be used with boring bars of different diameters.

Preferably a single boring bit is employed in boring all of the bearings. This is advisable in view of the fact that it would be difficult, in view of the spacing of crank shaft bearings in different engines, to provide locations which would enable the use of a plurality of boring bits which would simultaneously engage and properly bore all of the bearings at the same time. Therefore, to avoid this difficulty and the inconvenience of trying to align the boring bits with all bearings and to further add to the universal adaptation of the tool, a single bit may be employed, the same being reapplied and readjusted to the proper position for successively boring the several bearings.

After the boring bit has been adjusted as above explained, the machine is in condition for driving of the boring bar for boring the first bearing. In the boring operation the boring bar is driven by power means such as an electric drill or other suitable means (not shown). Appropriate feed means is employed for feeding the boring bar along the bearing as it is bored, the same being described in detail in my said copending application.

I believe that the construction and operation of my invention will be readily understood from the foregoing description. The micrometer setting, in accordance with my invention, assures accurate setting of the tool bit with resultant accurate boring of the bearing at all times and under all operating conditions.

I claim:

1. A micrometer device for setting a tool bit having a cutting point and adapted to be mounted in a cylindrical boring bar, which comprises a support having an upright standard with a forked base portion providing spaced arms rigid with each other and having flat surfaces adapted to seat tangentially on the boring bar at peripherally spaced points, and a micrometer barrel mounted on said standard and adjustably carrying a spindle on an axis extending perpendicularly to the flat surface on one of said arms with the end face of said spindle adapted to engage the cutting point of the tool bit, said barrel and spindle being calibrated for determining the extent said cutting point projects beyond the boring bar.

2. A micrometer device for setting a tool bit having a cutting point and adapted to be mounted in a cylindrical boring bar, which comprises a support having an upright standard with a forked base portion provided with spaced arms rigid with each other having flat surfaces adapted to rest tangentially on the boring bar, a micrometer barrel mounted on said standard and adjustably carrying a spindle on an axis extending perpendicularly to one of said flat surfaces with the end face of said spindle adapted to engage the cutting point of the tool bit, and means on said base portion for holding said surface in engagement with the bar, said barrel and spindle being calibrated for determining the extent said cutting point projects beyond the boring bar.

3. A micrometer device for setting a tool bit having a cutting point and adapted to be mounted in a cylindrical boring bar, which comprises a support having an upright standard with a forked base portion provided with spaced arms rigid with each other having flat surfaces extending perpendicularly to said standard and adapted to rest tangentially on said boring bar, a micrometer barrel mounted for adjustment along said standard and adjustably carrying a spindle on an axis extending perpendicularly to said flat surfaces and parallel to said standard, the end face of said spindle being adapted to engage the cutting point of the tool bit, and means on said base portion for holding said surface in engagement with the bar, said barrel and spindle being calibrated for determining the extent said cutting point projects beyond the boring bar.

4. An instrument for use in setting a tool bit in a boring bar, said instrument comprising a V-block having a flat contact surface on one of the legs forming the V adapted to be seated on the cylindrical surface of the boring bar for positioning the instrument, and a micrometer having a spindle which is micrometrically adjustable lengthwise, said spindle having an anvil surface at one end which is normal to the longitudinal axis of the spindle, said micrometer being rigidly supported by said V-block so that the longitudinal axis of said spindle is perpendicular to the said flat contact surface of the V-block and so related to the other leg of the V-block that said longitudinal axis extended passes through and is perpendicular to the axis of rotation of the boring bar, where the boring bar has a certain predetermined diameter, the aforementioned anvil surface being at the end of the spindle nearest the boring bar.

5. An instrument for use in setting a tool bit in a boring bar, said instrument comprising a V-block having a flat contact surface on one of the legs forming the V adapted to be seated on the cylindrical surface of the boring bar for positioning the instrument, a micrometer having a spindle which is micrometrically adjustable lengthwise, said spindle having an anvil surface at one end which is normal to the longitudinal axis of the spindle, said micrometer being rigidly supported by said V-block so that the longitudinal axis of said spindle is perpendicular to the said flat contact surface of the V-block and so related to the other leg of the V-block that said longitudinal axis extended passes through and is perpendicular to the axis of rotation of the boring bar, where the boring bar has a certain predetermined diameter, the aforementioned anvil surface being at the end of the spindle nearest the boring bar, and a spring clip attached to said V-block and adapted to embrace the boring bar, being thereby effective to secure the instrument to the boring bar.

6. An instrument for use in setting a tool bit in a boring bar, said instrument comprising a V-block having a flat contact surface on one of the legs forming the V adapted to be seated on the cylindrical surface of the boring bar for positioning the instrument, a shank carried by and projecting from said V-block, a clamp carried by said shank and adjustably movable lengthwise thereof, and a micrometer having a spindle which is micrometrically adjustable lengthwise, said spindle having an anvil surface at one end which is normal to the longitudinal axis of the spindle, said micrometer being attached by said clamp to said shank and movable with said clamp lengthwise of said shank, the longitudinal axis of said spindle being parallel to the longitudinal axis of said shank, said micrometer being so supported that the longitudinal axis of said spindle is perpendicular to the said flat contact surface of the V-block and so related to the other leg of the V-block that the longitudinal axis of the spindle extended passes through and is perpendicular to the axis of rotation of the boring bar, where the boring bar has a certain predetermined diameter, the aforementioned anvil surface being at the end of the spindle nearest the boring bar.

7. An instrument for use in setting a tool bit in a boring bar, said instrument comprising a V-block having flat contact surfaces on the legs forming the V adapted to be seated on the cylindrical surface of the boring bar for positioning the instrument, a shank carried by and projecting from said V-block, a clamp carried by said shank and adjustably movable lengthwise thereof, a micrometer having a spindle which is micrometrically adjustable lengthwise, said spindle having an anvil surface at one end which is normal to the longitudinal axis of the spindle, said micrometer being attached by said clamp to said shank and movable with said clamp lengthwise of said shank, the longitudinal axis of said spindle being parallel to the longitudinal axis of said shank, said micrometer being so supported that the longitudinal axis of said spindle is perpendicular to the flat contact surface of one of the legs of the V-block and so related to the other leg of the V-block that the longitudinal axis of the spindle extended passes through and is perpendicular to the axis of rotation of the boring bar, where the boring bar has a certain predetermined diameter, the aforementioned anvil surface being at the end of the spindle nearest the boring bar, and a clip for securing the instrument to the boring bar, said clip comprising a leaf spring curved to embrace the boring bar and hingedly connected at one end to said V-block.

WALLACE F. MITCHELL.

REFERENCES CITED

The following references are of record in the file of this patent:

UNITED STATES PATENTS

| Number | Name | Date |
| --- | --- | --- |
| 304,389 | Willey et al. | Sept. 2, 1884 |
| 1,416,810 | Foster | May 23, 1922 |
| 1,421,073 | Furness et al. | June 27, 1922 |
| 1,513,024 | Baumann | Oct. 28, 1924 |
| 1,678,030 | Yount | July 24, 1928 |